United States Patent
Kim et al.

(10) Patent No.: US 9,510,338 B2
(45) Date of Patent: Nov. 29, 2016

(54) DATA TRANSMISSION METHOD AND DATA TRANSMISSION DEVICE

(71) Applicant: LG ELECTRONICS INC., Seoul (KR)

(72) Inventors: Bonghoe Kim, Anyang-si (KR); Dongyoun Seo, Anyang-si (KR); Hanbyul Seo, Anyang-si (KR); Joonkui Ahn, Anyang-si (KR); Suckchel Yang, Anyang-si (KR); Yunjung Yi, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 81 days.

(21) Appl. No.: 14/398,308

(22) PCT Filed: May 3, 2013

(86) PCT No.: PCT/KR2013/003846
§ 371 (c)(1),
(2) Date: Oct. 31, 2014

(87) PCT Pub. No.: WO2013/165206
PCT Pub. Date: Nov. 7, 2013

(65) Prior Publication Data
US 2015/0085785 A1 Mar. 26, 2015

Related U.S. Application Data

(60) Provisional application No. 61/642,413, filed on May 3, 2012.

(51) Int. Cl.
*H04W 4/00* (2009.01)
*H04W 72/04* (2009.01)
(Continued)

(52) U.S. Cl.
CPC .......... *H04W 72/042* (2013.01); *H04L 5/0048* (2013.01); *H04L 5/0092* (2013.01); *H04L 5/0044* (2013.01); *H04W 28/06* (2013.01)

(58) Field of Classification Search
CPC .......................... H04W 72/042; H04L 5/0048
USPC .................................................. 370/328–339
See application file for complete search history.

(56) References Cited

U.S. PATENT DOCUMENTS

2013/0044727 A1* 2/2013 Nory .................... H04L 5/0092
370/330

OTHER PUBLICATIONS

3GPP TS 36.213 V10.5.0, "3rd Generation Partnership Project; Technical Specification Group Radio Access Network; Evolved Universal Terrestrial Radio Access (E-UTRA); Physical layer procedures, (Release 10)", Technical Specification, (Mar. 2012).
(Continued)

*Primary Examiner* — Iqbal Zaidi
(74) *Attorney, Agent, or Firm* — Birch, Stewart, Kolasch & Birch, LLP

(57) ABSTRACT

A data transmission method and a data transmission device are disclosed. A method for receiving control data by a terminal can comprise the steps of demodulating downlink control information (DCI) including an assignment flag and downlink (DL) resource allocation; and demodulating physical downlink shared channel (PDSCH) data by using the DL resource allocation, wherein when the PDSCH data is demodulated on the basis of a demodulation reference signal (DM-RS), the assignment flag indicates information on a reference signal (RS) used for the demodulation of the PDSCH data or information on a PDSCH transmission antenna port.

14 Claims, 14 Drawing Sheets

(51) Int. Cl.
  *H04L 5/00* (2006.01)
  *H04W 28/06* (2009.01)

(56) References Cited

OTHER PUBLICATIONS

3GPP TSG RAN WG1 Meeting #67, R1-113957, "DM RS sequence setting for downlink CoMP", ETRI, 7.5.2.1.1 DM-RS, San Francisco, USA, Nov. 14-18, 2011.

3GPP TSG RAN WG1 Meeting #68bis, R1-121155, "DCI for Rel-11 CoMP Operations", Panasonic, 7.5.5 Coordinated MultiPoint operation, Jeju, Korea, Mar. 26-30, 2012.

3GPP TSG RAN WG1 Meeting #68bis, R1-121286, "Signaling ePDCCH presence using demodulation reference signals", Nokia, Nokia Siemens Networks, 7.6.1, Jeju, Korea, Mar. 26-30, 2012.

3GPP TSG RAN WG1 Meeting #68bis, R1-121453, "Details of Reference Signals for E-PDCCH", LG Electronics, 7.6.1, Jeju, Korea, Mar. 26-30, 2012.

* cited by examiner

DATA TRANSMISSION METHOD AND DATA TRANSMISSION DEVICE

CROSS REFERENCE TO RELATED APPLICATIONS

This application is the National Phase of PCT International Application No. PCT/KR2013/003846, filed on May 3, 2013, which claims priority under 35 U.S.C. 119(e) to U.S. Provisional Application No. 61/642,413, filed on May 3, 2012, all of which are hereby expressly incorporated by reference into the present application.

BACKGROUND OF THE INVENTION

1. Field of the Invention

The present invention relates to wireless communications, and more specifically, to a data transmission method and apparatus.

2. Related Art

In LTE (long term evolution) release 12, intensive research is underway for better performance in light of capacity, transmission coverage, inter-cell coordination, and costs. For such better performance, LTE release 12 is in discussion for adopting various techniques such as small cell enhancement, macro cell enhancement, new carrier type or machine type communication in technical aspects.

The enhancement in capacity and transmission coverage which is targeted by LTE release 12 may be achieved by unification between LTE-WLAN (wireless local area network) and small cell enhancement based on inter-site carrier aggregation and macro cell enhancement. As the cell size decreases, there is a frequent shift between cells, thus leading to an increase in the amount of traffic signaled when a user equipment relocates. To address such issues, the small cell enhancement may be utilized to reduce signaling that is transmitted from the RAN (Radio Access Network) to the core network, thus optimizing the small cells.

The NCT (New Carrier Type) is a newly defined frame type that is different from legacy frame configuration. The NCT may be a carrier type optimized for small cells, but may be applicable to macro cells as well. The NCT may reduce overhead that occurs due to transmission of a CRS (cell-specific reference signal) and demodulate downlink control channel based on a DM-RS (demodulation reference signal). The new definition of NCT may save base stations energy consumption while reducing interference that occurs in the HetNet (heterogeneous network). Further, use of the NCT may decrease reference signal overhead that occurs when data transmission is performed using a plurality of downlink antennas. More specifically, the NCT may be defined as a carrier that maintains the existing frame architecture (e.g., CP length, sub-frame structure, duplex mode) but differs in the structure of a reference signal actually transmitted, i.e., not backward compatible (to Rel-11 and below UEs).

SUMMARY OF THE INVENTION

An object of the present invention is to provide a method of transmitting and receiving control data.

Another object of the present invention is to provide an apparatus of transmitting and receiving control data.

To achieve the above objects, according to an aspect of the present invention, a method of receiving control data may comprise demodulating DCI (downlink control information) including an assignment flag and a DL (downlink) resource allocation and using the DL resource allocation to demodulate PDSCH (physical downlink shared channel) data, wherein if the PDSCH data is demodulated based on a DM-RS (demodulation reference signal), the assignment flag indicates information regarding an RS (reference signal) used for demodulating the PDSCH data or information regarding a transmit antenna port of the PDSCH, wherein if the PDSCH data is demodulated based on a cell-specific RS, the assignment flag indicates an LVRB (localized virtual resource block) assignment or a DVRB (distributed virtual resource block) assignment for a PDSCH, wherein the LVRB assignment indicates at least one PRB (physical resource block) at the same position in a frequency domain, wherein the DVRB assignment indicates at least one PRB at distributed positions in the frequency domain, wherein the assignment flag has one bit, wherein the DM-RS is generated from a pseudo-random sequence initialized by a scramble identifier, wherein the scramble identifier is given by a base station, and wherein the cell-specific RS is generated from a pseudo-random sequence initialized by a cell identifier.

To achieve the above objects, according to another aspect of the present invention, a user equipment receiving control data in a wireless communication system, the user equipment comprising a processor, the process configured to demodulate DCI (downlink control information) including an assignment flag and a DL (downlink) resource allocation and to use the DL resource allocation to demodulate PDSCH (physical downlink shared channel) data, wherein if the PDSCH data is demodulated based on a DM-RS (demodulation reference signal), the assignment flag indicates information regarding an RS (reference signal) used for demodulating the PDSCH data or information regarding a transmit antenna port of the PDSCH, wherein if the PDSCH data is demodulated based on a cell-specific RS, the assignment flag indicates an LVRB (localized virtual resource block) assignment or a DVRB (distributed virtual resource block) assignment for a PDSCH, wherein the LVRB assignment indicates at least one PRB (physical resource block) at the same position in a frequency domain, wherein the DVRB assignment indicates at least one PRB at distributed positions in the frequency domain, wherein the assignment flag has one bit, wherein the DM-RS is generated from a pseudo-random sequence initialized by a scramble identifier, wherein the scramble identifier is given by a base station, and wherein the cell-specific RS is generated from a pseudo-random sequence initialized by a cell identifier.

Data transmission efficiency of base stations may be increased.

BRIEF DESCRIPTION OF THE DRAWINGS

FIG. 6 is a view illustrating an example of monitoring a PDCCH, for which 3GPP TS 36.213 V10.2.0 (2011-06), Ch. 9 may be referred to.

DESCRIPTION OF EXEMPLARY EMBODIMENTS

A wireless device may be stationary or mobile and a UE (User Equipment) may be referred to as an MS (mobile station), an MT (mobile terminal), a UT (user terminal), an SS (subscriber station), a wireless device, a PDA (personal digital assistant), a wireless modem, or a handheld device. Or, a wireless device may be a device that supports only data communication such as an MTC (machine-type communication) device.

A base station (BS) generally denotes a fixed station that communicates with a wireless device and may be referred to as an eNB (evolved-NodeB), a BTS (Base Transceiver System), or an access point.

Hereinafter, the present invention is described to apply based on 3GPP (3d Generation Partnership Project) TS (Technical Specification) release 8-based 3GPP LTE (long term evolution) or 3GPP TS release 10-based 3GPP LTE-A. This is merely an example, and the present invention may apply to various wireless communication networks. Hereinafter, the "LTE" comprises LTE and/or LTE-A.

Figure 1:
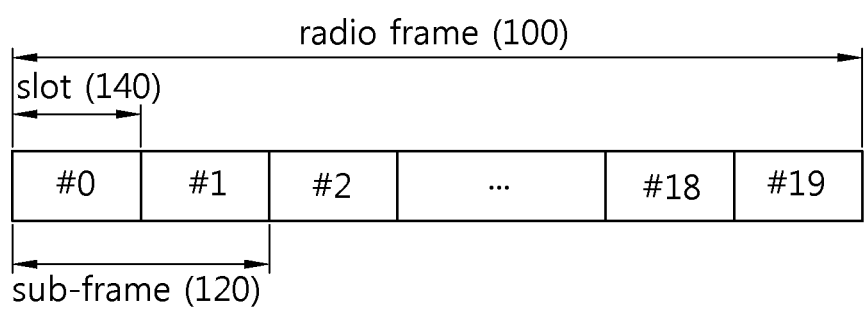
FIG. 1 illustrates the structure of a radio frame in 3GPP (3rd Generation Partnership Project) LTE (Long Term Evolution).

FIG. 1 shows the architecture of a radio frame in the 3GPP (3$^{rd}$ Generation Partnership Project) LTE (long term evolution).

Regarding the architecture of the radio frame 100, refer to Ch. 5, 3GPP (3rd Generation Partnership Project) TS 36.211 V8.2.0 (2008-03) "Technical Specification Group Radio Access Network; Evolved Universal Terrestrial Radio Access (E-UTRA); Physical channels and modulation (Release 8)". Referring to FIG. 1, the radio frame 100 consists of ten sub-frames 120, and one sub-frame 120 consists of two slots 140. In the radio frame 100, the slots 140 may be indexed from slot #0 to slot #19, or the sub-frames 120 may be indexed from sub-frame #0 to sub-frame #9. Sub-frame #0 may include slot #0 and slot #1.

The time taken to transmit one sub-frame 120 is referred to as a TTI (transmission time interval). The TTI may be a basis of scheduling for data transmission. For example, the length of one radio frame 100 may be 10 ms, the length of one sub-frame 120 may be 1 ms, and the length of one slot 140 may be 0.5 ms.

One slot 140 includes a plurality of OFDM (orthogonal frequency division multiplexing) symbols in the time domain and a plurality of subcarriers in the frequency domain. Since the 3GPP LTE adopts OFDMA for downlink, the OFDM symbol is to represent one symbol period and may be also referred to by other terms depending on multiple access schemes. For example, in case the SC-FDMA (single carrier-frequency division multiple access) is used as the uplink multiple access scheme, it may be called the SC-FDMA symbol. The resource block (RB) is a basis for resource allocation and includes a plurality of consecutive subcarriers in one slot. The resource block is described in more detail with reference to FIG. 2. The architecture of the radio frame 100 shown in FIG. 1 is merely an example of the frame architecture. Accordingly, the number of sub-frames 120 included in the radio frame 100, the number of slots 140 included in the sub-frame 120, or the number of OFDM symbols included in the slot 140 may be varied thereby defining new radio frame formats.

According to the 3GPP LTE standards, in case a normal cyclic prefix (CP) is used, one slot includes seven OFDM symbols, and in case an extended CP is used, one slot includes six OFDM symbols.

Wireless communication systems may be generally classified into a FDD (frequency division duplex) scheme and a TDD (time division duplex) scheme. In accordance with the FDD scheme, different frequency bands are adopted for uplink transmission and downlink transmission, respectively. In the TDD scheme, uplink transmission and downlink transmission take up the same frequency band and are performed at different times. In the TDD scheme, channel response is substantially reciprocal. This means that in a given frequency band, a downlink channel response and a uplink channel response are nearly the same. Accordingly, in the TDD-based wireless communication system, the downlink channel response may be advantageously obtained from the uplink channel response. Since in the TDD scheme the entire frequency band is time-divided for uplink transmission and downlink transmission, the downlink transmission by the base station may not be performed simultaneously with the uplink transmission by the user equipment. In the TDD system in which uplink transmission and downlink transmission are distinguished from each other on a per-sub-frame basis, the uplink transmission and the downlink transmission are performed in different sub-frames.

Figure 2:
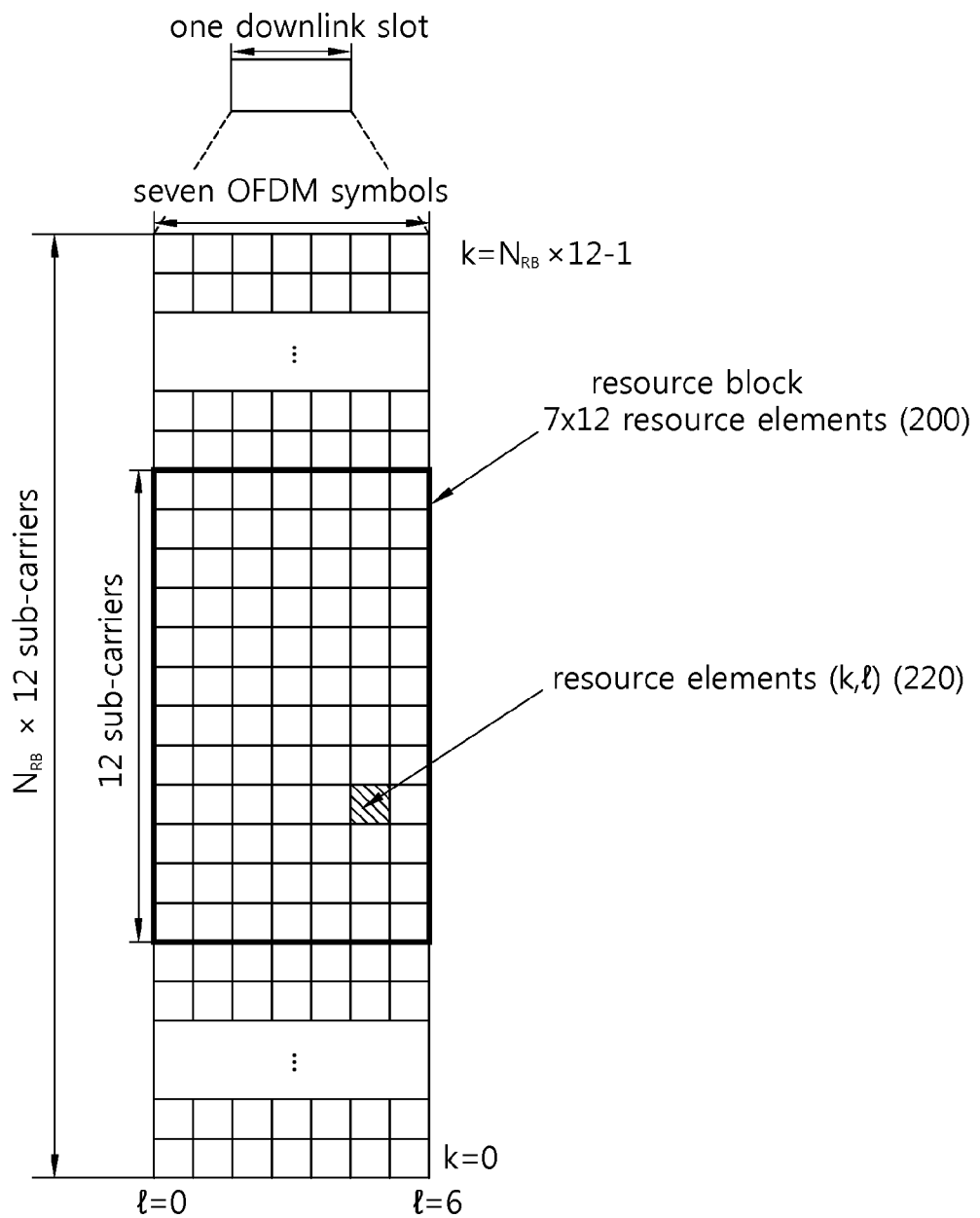
FIG. 2 illustrates an example resource grid for a downlink slot.

FIG. 2 shows an example of a resource grid for a downlink slot.

The downlink slot includes a plurality of OFDM symbols in the time domain and NRB resource blocks in the frequency domain. NRB, the number of resource blocks included in the downlink slot, is dependent upon downlink transmission bandwidth configured in the cell. For example, in the LTE system, NRB may be any one of 6 to 110 depending on a transmission bandwidth used. One resource block 200 includes a plurality of subcarriers in the frequency domain. The structure of an uplink slot may be the same as the structure of the downlink slot.

Each element on the resource grid is referred to as resource element 220. The resource element 220 on the resource grid may be identified by an index pair (k, l) in the slot. Here, k (k=0, . . . , NRBx12-1) is a subcarrier index in the frequency domain, and l (l=0, . . . , 6) is an OFDM symbol index in the time domain.

Here, one resource block 200 includes 7×12 resource elements 220 consisting of seven OFDM symbols in the time domain and twelve subcarriers in the frequency domain, for example. However, the number of OFDM symbols and subcarriers in the resource block 200 is not limited thereto. The number of OFDM symbols and the number of subcarriers may vary depending on the length of CP or frequency spacing. For example, in the case of normal CP, the number of OFDM symbols is 7, and in the case of expanded CP, the number of OFDM symbols is 6. The number of subcarriers in one OFDM symbol may be any one of 128, 256, 512, 1024, 1536, and 2048.

Figure 3:
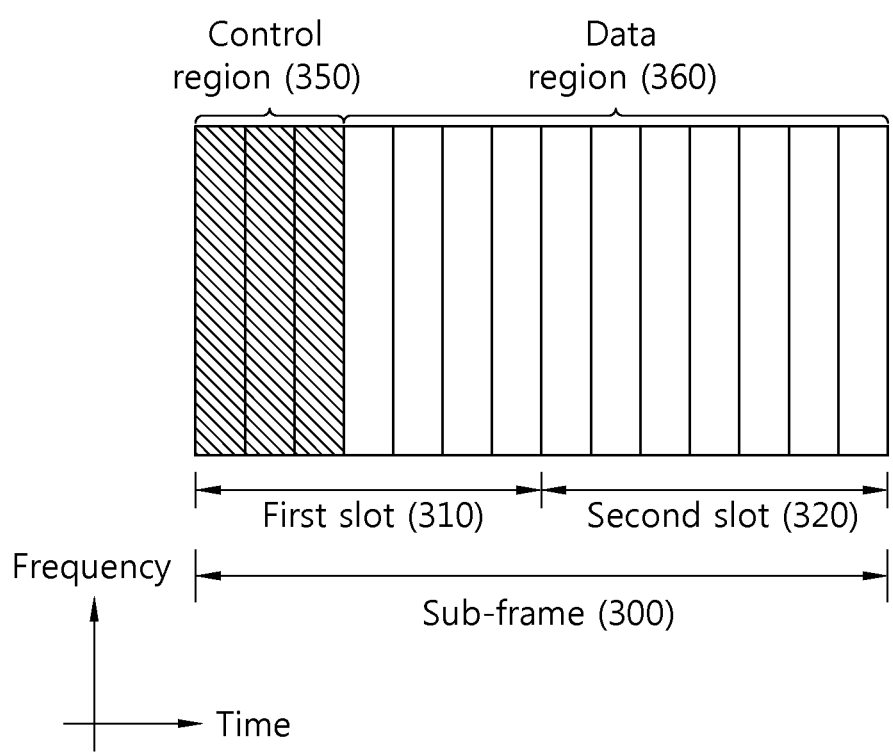
FIG. 3 illustrates the structure of a downlink sub-frame.

FIG. 3 shows the structure of a downlink sub-frame.

The downlink sub-frame 300 includes two slots 310 and 320 in the time domain, and each slot 310 and 320 includes seven OFDM symbols in the normal CP. The first three OFDM symbols (up to four OFDM symbols for 1.4 Mhz bandwidth) of the first slot 310 in the sub-frame 300 are a control region 350 to which control channels are assigned, and the remaining OFDM symbols are a data region 360 to which the PDSCH (Physical Downlink Shared CHannel).

The PDCCH may transmit resource allocation of DL-SCH (downlink-shared channel) and transmission format, resource allocation information of UL-SCH (uplink shared channel), on-PCH paging information, on-DL-SCH system information, resource allocation of the upper layer control message such as random access response transmitted on PDSCH, a set of transmission power control commands for each UE in any UE group and activation information of VoIP (voice over Internet protocol). A plurality of PDCCH regions may be defined in the control region 350, and the user equipment may monitor a plurality of PDCCHs. The PDCCH is transmitted over aggregation of one or some consecutive CCEs (control channel elements). The CCE is the unit of logical allocation, which is used to provide a coding rate depending on the status of the radio channel to the PDCCH. The CCE corresponds to a plurality of resource element groups. The format of PDCCH and the number of bits in available PDCCH are determined depending on the relationship between the number of CCEs and coding rate provided by the CCEs.

The base station determines the format of the PDCCH depending on DCI (downlink control information) to be sent to the user equipment and adds a CRC (cyclic redundancy check) to the control information. In the CRC, depending on the owner or purpose of the PDCCH, a unique identifier (RNTI: radio network temporary identifier) is masked. In the case of PDCCH for specific user equipment, a unique identifier of the user equipment, e.g., C-RNTI (cell-RNTI), may be masked in the CRC. Or, in the case of PDCCH for paging message, a paging indicating identifier, e.g., P-RNTI (paging-RNTI), may be masked in the CRC. In the case of PDCCH for system information block (SIB), a system information identifier, SI-RNTI (system information-RNTI), may be masked in the CRC. To indicate a random access response, which is a response to transmission of a random access preamble of the user equipment, RA-RNTI (random access-RNTI) may be masked in the CRC.

Figure 4:
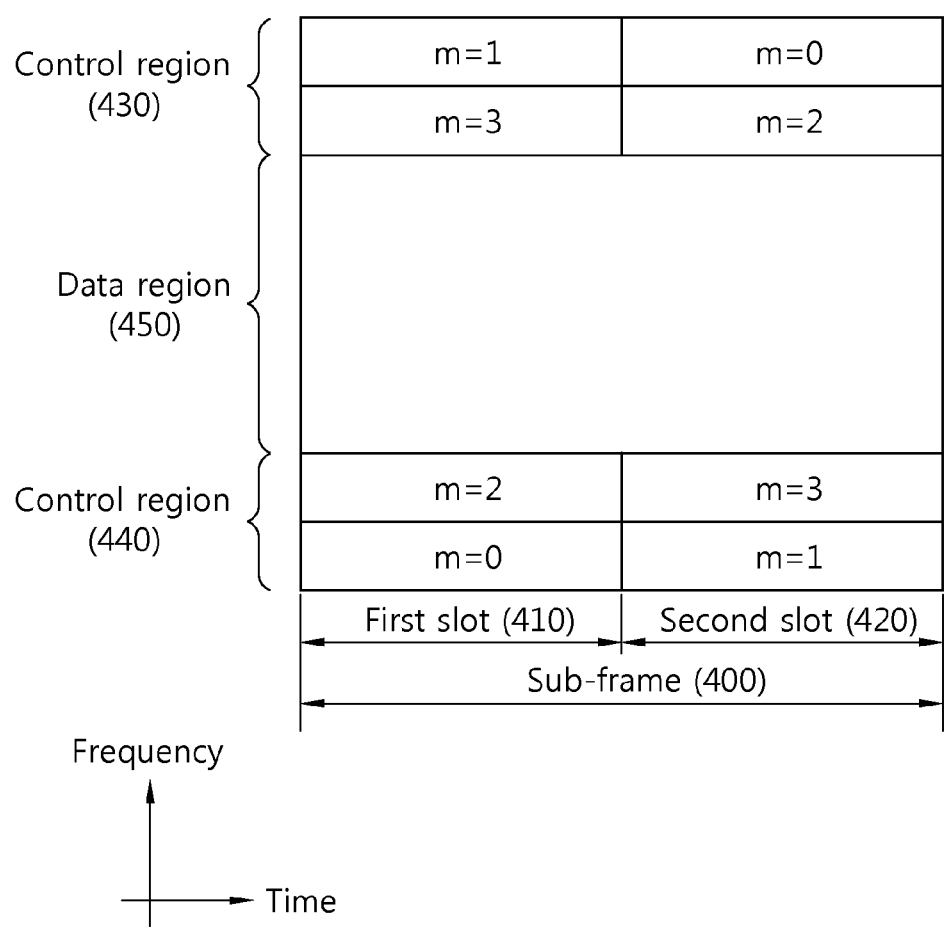
FIG. 4 illustrates the structure of an uplink sub-frame.

FIG. 4 shows the structure of an uplink sub-frame.

The uplink sub-frame may be divided into control regions 430 and 440 and a data region 450 in the frequency domain. The control regions 430 and 440 are allocated a PUCCH (physical uplink control channel) on which uplink control information is transmitted. The data region 405 is allocated a PUSCH (physical uplink shared channel) on which data is transmitted. When indicated from an upper layer, the user equipment may simultaneously support PUSCH and PUCCH.

PUCCH, for one user equipment, is allocated in a resource block (RB) pair in the sub-frame 400. The resource blocks in the RB pair occupy different subcarriers in the first slot 410 and the second slot 420. The frequency taken up by the resource block of the RB pair, which is allocated to PUCCH, is varied with respect to slot boundary. This is referred to as RB pair allocated for PUCCH being frequency-hopped at the slot boundary. The user equipment transmits uplink control information through subcarriers different from each other over time, thus leaving frequency diversity gain being able to be obtained. m is a locational index indicating a logical frequency domain location of the RB pair allocated for PUCCH in the sub-frame.

The uplink control information transmitted on PUCCH includes HARQ (hybrid automatic repeat request) ACK (acknowledgement)/NACK (non-acknowledgement), CQI (channel quality indicator) indicating a downlink channel status, and SR (scheduling request) that is an uplink radio resource allocating request.

The PUSCH is mapped with an UL-SCH (uplink shared channel) that is a transport channel. Uplink data transmitted on PUSCH may be a transport block that is a data block for UL-SCH transmitted during TTI. The transport block may be user information. Or, the uplink data may be multiplexed data. The multiplexed data may be data obtained by multiplexing transport block for UL-SCH with control information. For example, the control information multiplexed with data may include CQI, PMI (precoding matrix indicator), HARQ, and RI (rank indicator). Or, the uplink data may consist of control information only.

Figure 5:
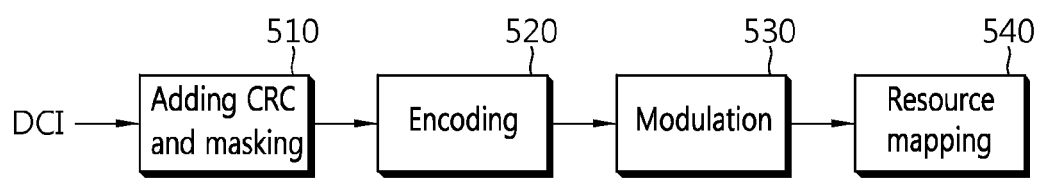
FIG. 5 is a block diagram illustrating a method of generating PDCCH data.

FIG. 5 is a block diagram illustrating a method of generating PDCCH data.

FIG. 5 specifically discloses a method of generating PDCCH data.

The user equipment performs blind decoding for detecting PDCCH. The blind decoding may be conducted based on the identified masked in the CRC of the received PDCCH (which is referred to as candidate PDCCH). The user equipment may identify whether the received PDCCH data is its own control data by performing CRC error check on the received PDCCH data.

The base station determines a PDCCH format depending on DCI to be sent to the user equipment, and then, adds a CRC (Cyclic Redundancy Check) to the DCI, and masks a unique identifier depending on the owner or purpose of the PDCCH, which is referred to as RNTI (Radio Network Temporary Identifier), in the CRC (block 510).

In the case of PDCCH for specific user equipment, the user equipment's unique identifier, e.g., C-RNTI (Cell-RNTI), may be masked in the CRC. Or, in the case of PDCCH for paging messages, a paging indicating identifier, e.g., P-RNTI (Paging-RNTI), may be masked in the CRC. In the case of PDCCH for system information, a system information identifier, SI-RNTI (system information-RNTI), may be masked in the CRC. To indicate a random access response, which is a response to transmission of a random access preamble, a RA-RNTI (random access-RNTI) may be masked in the CRC. To indicate TPC (transmit power control) commands for a plurality of UE, a TPC-RNTI may be masked in the CRC.

If C-RNTI is used, PDCCH conveys control information for corresponding specific user equipment, which is referred to as user equipment (UE)-specific control information, and if other RNTIs are used, PDCCH conveys common control information received by all or a plurality of user equipment in the cell.

The CRC-added DCI is encoded to generate coded data (block 520). The encoding includes channel encoding and rate matching.

The coded data is subjected to modulation to generate modulated symbols (block 530).

The modulated symbols are mapped with physical REs (resource elements) (block 540). The modulated symbols may be mapped with each RE.

The control region in the sub-frame includes a plurality of CCEs (control channel elements). The CCE is a basis for logical allocation, which is used to provide a coding rate depending on the status of the radio channel to the PDCCH and corresponds to a plurality of REGs (resource element groups). The REG includes a plurality of resource elements. Depending on the relationship between the number of CCEs and the coding rate provided by the CCEs, the format of the PDCCH and the number of bits of available PDCCH are determined.

One REG includes four REs, and one CCE includes 9 REGs. To constitute one PDCCH, {1, 2, 4, 8} CCEs may be used. Each element in {1, 2, 4, 8} is referred to as a CCE aggregation level.

The number of CCEs used for transmission of PDCCH is determined by the base station depending on channel status. For example, one CCE may be used for transmission of PDCCH for a wireless device having a good link channel status. For a wireless device with a poor downlink channel status, eight CCEs may be used for transmission of PDCCH.

The control channel consisting of one or more CCEs is subjected to per-REG basis interleaving and cyclic shift based on a cell ID (identifier), and is then mapped with a physical resource.

Figure 6:
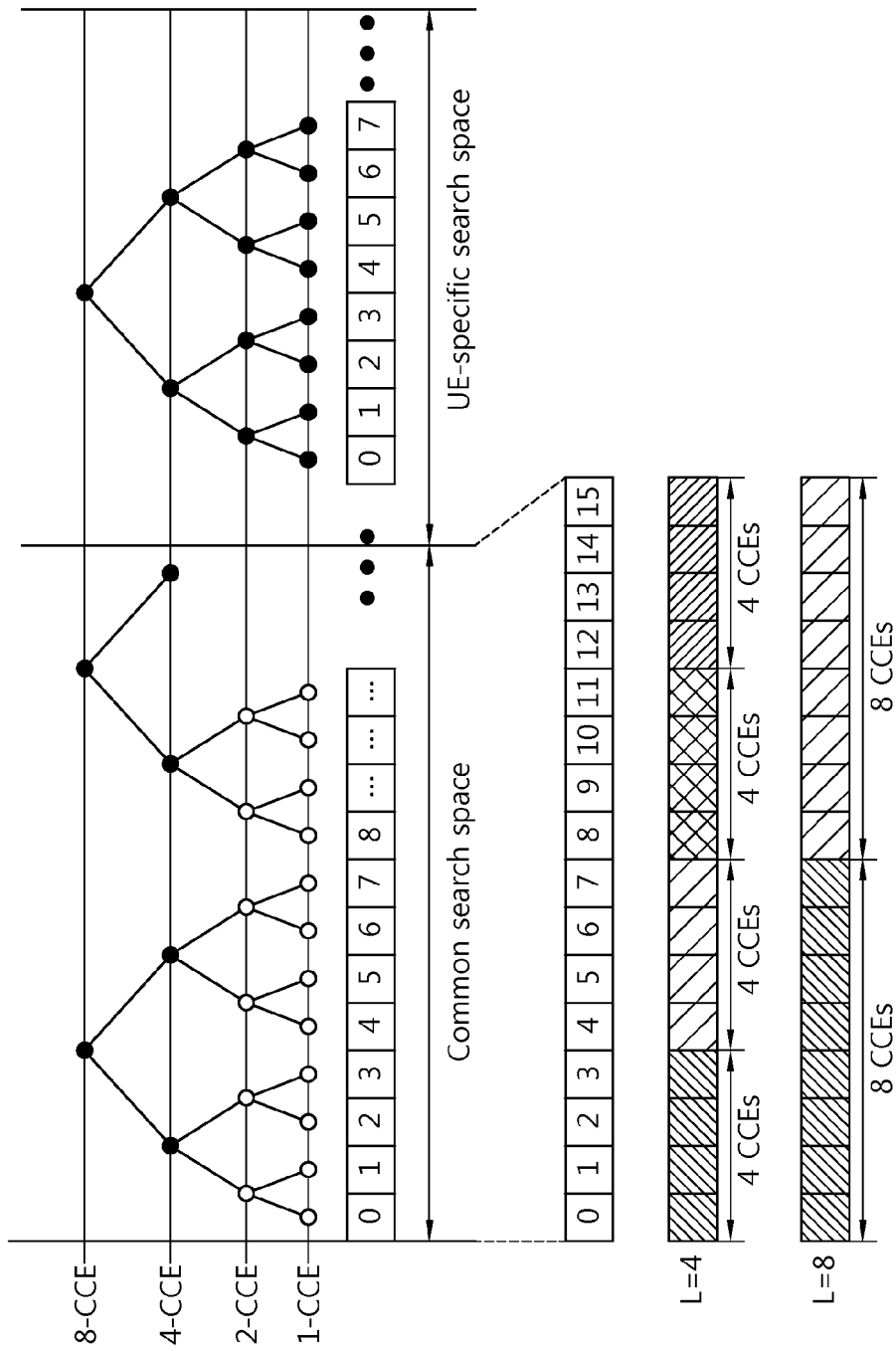

FIG. 6 is a view illustrating exemplary PDCCH monitoring. Ch. 9 of 3GPP TS 36.213 V10.2.0 (2011-06) may be referred.

The user equipment may perform blind decoding for detecting PDCCH. The blind decoding is a scheme in which the CRC of the received PDCCH (which is referred to as PDCCH candidate) data is de-masked based on a specific identifier and then CRC error check is performed to verify whether the corresponding PDCCH is its control channel. The user equipment is not aware of in what position of the control region its PDCCH data has been transmitted from the base station using what CCE aggregation level or DCI format.

A plurality of PDCCHs may be transmitted in one sub-frame. The user equipment monitors the plurality of PDCCHs for each sub-frame. Here, the monitoring means that the user equipment attempts to decode PDCCH according to the PDCCH format.

In the 3GPP LTE, the user equipment uses a search space to reduce burden that is caused by performing blind decoding. The search space may be a monitoring set of CCEs to search PDCCH. The user equipment may monitor PDCCH based on the search space.

The search space is divided into a common search space and a UE-specific search space. The common search space is a space for searching PDCCH having common control information and consists of 16 CCEs from 0 to 15 and supports PDCCH having CCE aggregation level {4,8}. However, a PDCCH (DCI format 0, 1A) conveying UE-specific information may be transmitted even in the common search space. The UE-specific search space supports a PDCCH having CCE aggregation level {1, 2, 4, 8}.

Table 1 that follows indicates the numbers of PDCCH candidates monitored by the user equipment.

TABLE 1

| Type | Search space $S_k^{(L)}$ Aggregation level L | Size [in CCEs] | Number of PDCCH candidates $M^{(L)}$ | DCI format |
|---|---|---|---|---|
| UE-specific | 1 | 6 | 6 | 0, 1, 1A, 1B, 1D, 2, 2A |
|  | 2 | 12 | 6 |  |
|  | 4 | 8 | 2 |  |
|  | 8 | 16 | 2 |  |
| Common | 4 | 16 | 4 | 0, 1A, 1C, 3/3A |
|  | 8 | 16 | 2 |  |

The size of the search space is determined by Table 1 above, and the start point of the search space is differently defined for each of the common search space and UE-specific search space. The start point of the common search space is fixed regardless of side haul/backhaul, but the start point of UE-specific search space may be varied for each sub-frame depending on the user equipment identifier (e.g., C-RNTI), CCE aggregation level and/or slot number of the radio frame. In case the start point of the UE-specific search space is within the common search space, the UE-specific search space and the common search space may overlap.

In aggregation level L∈{1,2,3,4}, search space S(L)k is defined as a set of PDCCH candidates. The CCE corresponding to PDCCH candidate m of search space S(L)k is given as follows:

$$L \cdot \{(Y_k+m') \bmod \lfloor N_{CCE,k}/L \rfloor\}+i \qquad \text{<Equation 1>}$$

Here, i=0, 1, . . . , L−1, m=0, . . . , M(L)−1, NCCE,k is the number of all CCEs that may be used for transmission of PDCCH in the control region of sub-frame k. The control region includes a set of CCEs numbered from 0 to NCCE, k−1. M(L) is the number of PDCCH candidates in the CCE aggregation level L in the given search space.

If a CIF (carrier indicator field) is configured for the user equipment, m'=m+M(L)ncif. ncif is a value of the CIF. If no CIF is set for the user equipment, m'=m.

In the common search space, Yk is set as 0 for two aggregation levels, L=4 and L=8.

In the UE-specific search space of aggregation level L, variable Yk is defined as follows:

$$Y_k=(A \cdot Y_{k-1}) \bmod D \qquad \text{<Equation 2>}$$

Here, Y−1=nRNTI≠0, A=39827, D=65537, k=floor(ns/2), and ns is a slot number in the radio frame.

When a wireless device monitors PDCCH based on C-RNTI, the DCI format and search space to be monitored are determined depending on a transmission mode of PDSCH. The following table shows an example of C-RNTI configured PDCCH monitoring:

TABLE 2

| Transmission mode | DCI format | Search space | Transmission mode of PDSCH depending on PDCCH |
|---|---|---|---|
| mode 1 | DCI format 1A | common and UE-specific | single antenna port, port 0 |

TABLE 2-continued

| Transmission mode | DCI format | Search space | Transmission mode of PDSCH depending on PDCCH |
|---|---|---|---|
| | DCI format 1 | UE-specific | single antenna port, port 0 |
| mode 2 | DCI format 1A | common and UE-specific | transmit diversity |
| | DCI format 1 | UE-specific | transmit diversity |
| mode 3 | DCI format 1A | common and UE-specific | transmit diversity |
| | DCI format 2A | UE-specific | CDD(Cyclic Delay Diversity) or transmit diversity |
| mode 4 | DCI format 1A | common and UE-specific | transmit diversity |
| | DCI format 2 | UE-specific | closed-loop spatial multiplexing |
| mode 5 | DCI format 1A | common and UE-specific | transmit diversity |
| | DCI format 1D | UE-specific | MU-MIMO(Multi-user Multiple Input Multiple Output) |
| mode 6 | DCI format 1A | common and UE-specific | transmit diversity |
| | DCI format 1B | UE-specific | closed-loop spatial multiplexing |
| mode 7 | DCI format 1A | common and UE-specific | If no. of PBCH transmission ports is 1, single antenna port, port 0, otherwise, transmit diversity |
| | DCI format 1 | UE-specific | Single antenna port, port 5 |
| mode 8 | DCI format 1A | common and UE-specific | If no. of PBCH transmission ports is 1, single antenna port, port 0, otherwise, transmit diversity |
| | DCI format 2B | UE-specific | Dual layer transmit (port 7 or 8), or single antenna port, port 7 or 8 |

Purposes of DCI formats are classified as follows.

TABLE 3

| DCI format | Details |
|---|---|
| DCI format 0 | Used for PUSCH scheduling |
| DCI format 1 | Used for scheduling one PDSCH codeword |
| DCI format 1A | Used for compact scheduling of one PDSCH codeword and random access process |
| DCI format 1B | Used for compact scheduling of one PDSCH codeword with precoding information |
| DCI format 1C | Used for very compact scheduling of one PDSCH codeword |
| DCI format 1D | Used for compact scheduling of one PDSCH codeword with precoding and power offset information |
| DCI format 2 | Used for PDSCH scheduling set in closed-loop multiplexing mode |
| DCI format 2A | Used for PDSCH scheduling of a plurality of user equipment set in open-loop multiplexing mode |
| DCI format 3 | Used for transmission of TPC command and PUCCH with two-bit power adjustments |
| DCI format 3A | Used for transmission of TPC command of PUSCH and PUCCH with one-bit power adjustment |

Figure 7:
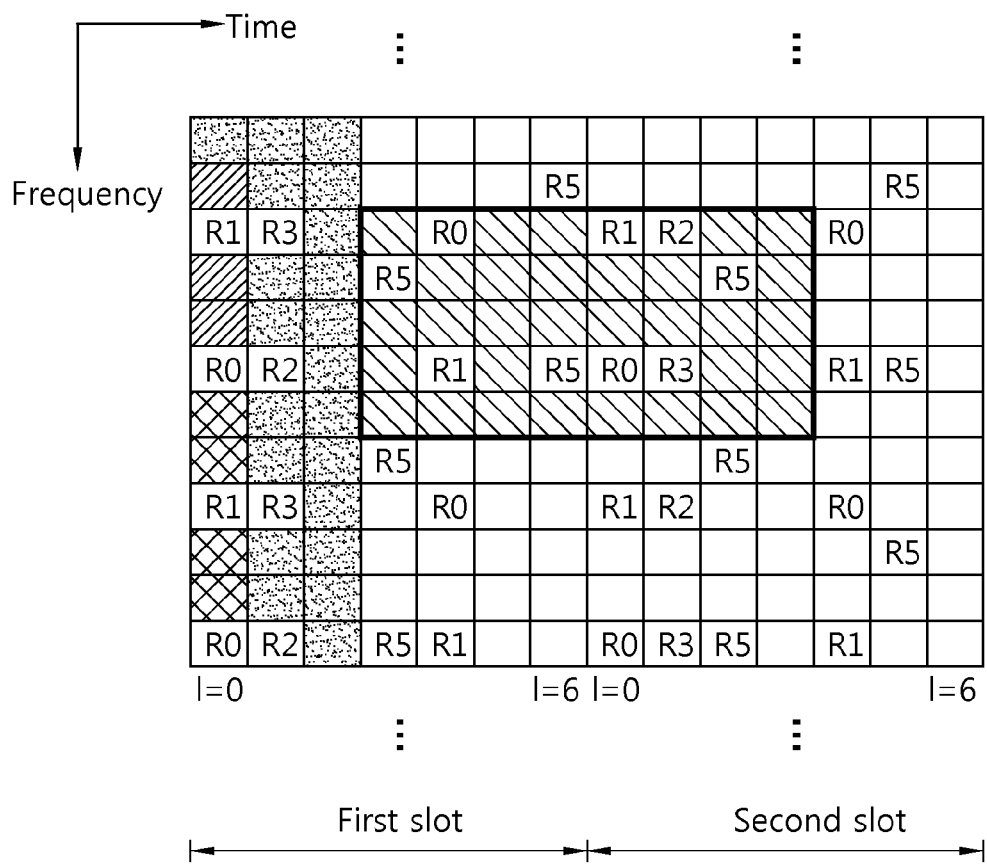
FIG. 7 illustrates an example in which a reference signal and a control channel are deployed in a 3GPP LTE downlink sub-frame.

FIG. 7 shows an example of arranging reference signals and control channels in a 3GPP LTE downlink sub-frame.

The control region (or PDCCH region) includes first three OFDM symbols and the data region where PDSCH is transmitted includes the remaining OFDM symbols.

PCFICH, PHICH and/or PDCCH are transmitted in the control region.

PHICH (physical HARQ ACK/NACK indicator channel) may transmit HARQ (hybrid automatic retransmission request) information in response to uplink transmission.

PCFICH (physical control format indicator channel) may indicate information on the number of OFDM symbols allocated to the PDCCH. For example, the CIF (control format indicator) of PCFICH may indicate three OFDM symbols. The region other than the resource for transmitting PCFICH and/or PHICH in the control region is a PDCCH region for the user equipment to monitor PDCCH.

Various reference signals may also be transmitted in the sub-frame.

The CRS (cell-specific reference signal) is a reference signal that may be received by all user equipment in the cell and may be transmitted over the entire downlink frequency band. In FIG. 6, 'R0' refers to a RE (resource element) for transmitting CRS for the first antenna port, 'R1' refers to an RE for transmitting CRS for the second antenna port, 'R2' refers to an RE for transmitting CRS for the third antenna port, and 'R3' is an RE for transmitting CRS for the fourth antenna port.

The RS sequence $r_{l,n_s}(m)$ for CRS is defined as follows:

$$r_{l,ns}(m) = \frac{1}{\sqrt{2}}(1 - 2 \cdot c(2m)) + j\frac{1}{\sqrt{2}}(1 - 2 \cdot c(2m+1))  \quad \text{⟨Equation 2⟩}$$

Here, $m=0, 1, \ldots, 2N_{RB}^{max,DL}-1$, $N_{RB}^{max,DL}$ is the maximum number of RBs, ns is a slot number in the radio frame, and l is an OFDM symbol number in the slot.

The pseudo-random sequence) c(i) is defined by a gold sequence with a length of 31 as follows:

$$c(n)=(x_1(n+Nc)+x_2(n+Nc)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \quad \text{<Equation 4>}$$

Here, Nc=1600, the first m-sequence is initiated so that $x1(0)=1, x1(n)=0, m=1, 2, \ldots, 30$. The second m-sequence is initiated, at the start of each OFDM symbol, as $c_{init}=2^{10} \cdot (7 \cdot (n_s+1)+l+1) \cdot (2 \cdot N_{ID}^{cell}+1)+2 \cdot N_{ID}^{cell}+N_{CP}$. $N_{ID}^{cell}$ is the PCI (physical cell identity) of the cell, and at the normal CP, $N_{CP}=1$, and at the expanded CP, $N_{CP}=0$.

Further, a URS (UE-specific Reference Signal) may be transmitted in the sub-frame. Although the CRS is transmitted in the entire region of the sub-frame, the URS is transmitted in the data region of the sub-frame and is used for demodulation of a corresponding PDSCH. In the drawings, 'R5' indicates an RE where the URS is transmitted. The DM-RS is a reference signal used for demodulation of EPDCCH data.

The URS may be transmitted in a RB resource-mapped with the corresponding PDSCH data. In FIG. 6, R5, in addition to the region where the PDSCH is transmitted, is marked as well, but this is provided to indicate the position of the RE to which the URS is mapped.

The URS is used by only the user equipment that receives the corresponding PDSCH. The RS sequence for the URS, $r_{l,n_s}(m)$, is the same as Equation 3. At this time, m=0, 1, . . . , $12N_{RB}^{PDSCH}-1$, and NPDSCH,RB is the number of RBs for transmission of the corresponding PDSCH. The pseudo-random number sequence generator is initiated, at the start of each sub-frame, as $c_{init}=(\lfloor n_s/2 \rfloor+1)\cdot(2N_{ID}^{cell}+1)\cdot 2^{16}+n_{RNTI}$. $n_{RNTI}$ is an identifier of the wireless device.

The above-described initiating method is associated with the case where the URS is transmitted through a single antenna, and when the URS is transmitted through a multi-antenna, the pseudo-random number sequence generator is initiated, at the start of each sub-frame, as $c_{init}=(\lfloor n_s/2 \rfloor+1)\cdot(2n_{ID}^{(nSCID)}+1)\cdot 2^{16}+n_{SCID}$. $n_{SCID}$ is a parameter obtained from a DL grant (e.g., DCI format 2B or 2C) related to PDSCH transmission.

The URS supports MIMO (Multiple Input Multiple Output) transmission. The RS sequence for URS in accordance with the antenna port or layer may be spread in a spread sequence as follows:

TABLE 4

| Layer | [ w(0) w(1) w(2) w(3)] |
|---|---|
| 1 | [+1 +1 +1 +1] |
| 2 | [+1 −1 +1 −1] |
| 3 | [+1 +1 +1 +1] |
| 4 | [+1 −1 +1 −1] |
| 5 | [+1 +1 −1 −1] |
| 6 | [−1 −1 +1 +1] |
| 7 | [+1 −1 −1 +1] |
| 8 | [−1 +1 +1 −1] |

The layer may be defined as an information path entered to a precoder. The rank is the number of non-zero eigenvalues of a MIMO channel matrix and is the same as the number of layers or the number of spatial streams. The layer may correspond to a spread sequence that is applied to URSs and/or antenna ports for distinguishing the URSs from each other.

Meanwhile, the PDCCH is monitored within a limited region that is the control region of the sub-frame, and the CRS transmitted on the entire band is used for demodulation of the PDCCH. As the type of control data is diversified and the amount of control data is increased, the flexibility of scheduling is deteriorated only with the existing PDCCH. Further, EPDCCH (enhanced PDCCH) is introduced to reduce overhead that is caused due to transmission of CRS.

Figure 8:
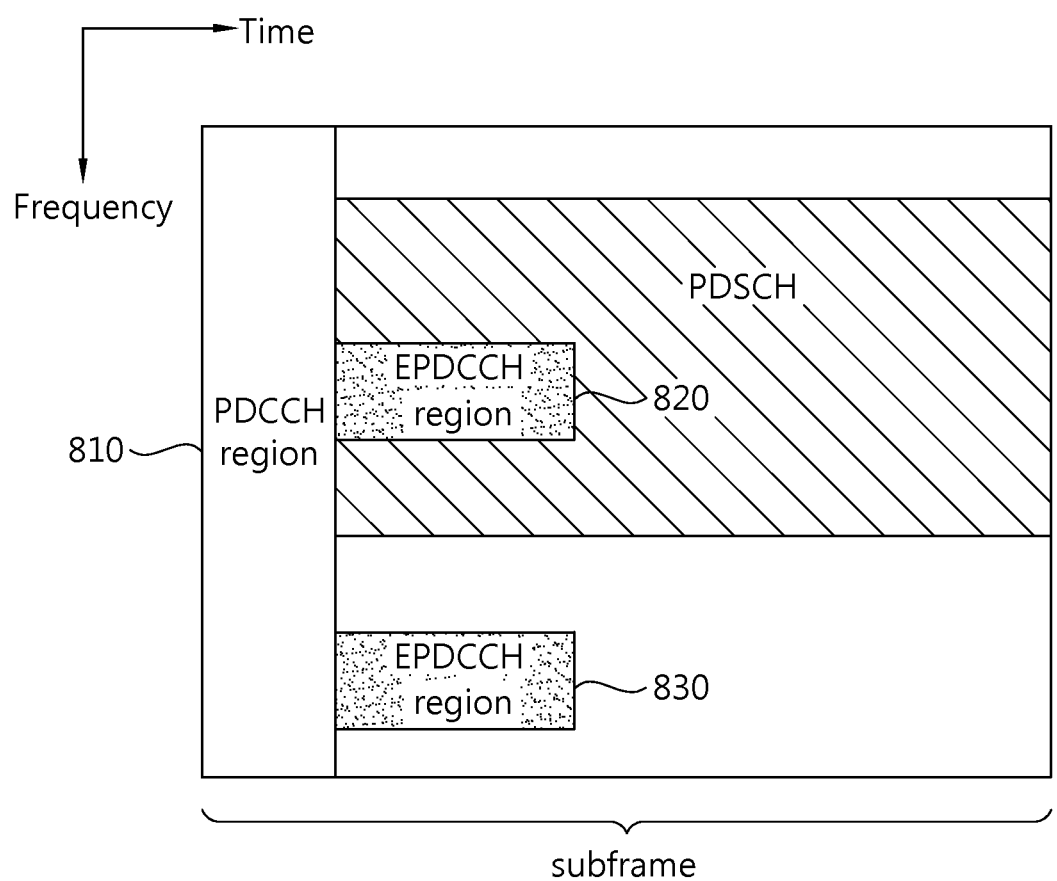
FIG. 8 illustrates an example sub-frame including EPD-CCH data.

FIG. 8 shows an exemplary sub-frame having an EPDCCH.

The sub-frame may include zero or one PDCCH region 810 and zero or one or more EPDCCH regions 820 and 830.

The EPDCCH regions 820 and 830 are regions where the user equipment monitors the EPDCCH. The PDCCH region 810 is positioned in the first, up to four OFDM symbols of the sub-frame. However, the EPDCCH regions 820 and 830 may be flexibly scheduled in the OFDM symbols subsequent to the PDCCH region 810.

One or more EPDCCH regions 820 and 830 are designated for the user equipment, and the user equipment may monitor EPDCCH data in the designated EPDCCH regions 820 and 830.

The number/position/size of the EPDCCH regions 820 and 830 and/or information on the sub-frame to monitor the EPDCCH may be notified from the base station to the user equipment through a RRC (radio resource control) message.

The PDCCH may be demodulated based on the CRS in the PDCCH region 810. In the EPDCCH regions 820 and 830, a DM-RS, not a CRS, may be defined for demodulation of the EPDCCH. The DM-RS may be transmitted in the corresponding EPDCCH regions 820 and 830.

The RS sequence for DM-RS is the same as Equation 3. At this time, m=0, 1, . . . , $12N_{RB}^{max,DL}-1$, and $N_{RB}^{max,DL}$ is the maximum number of RBs. The pseudo-random number sequence generator may be initiated, at the start of each sub-frame, as $c_{init}=(\lfloor n_s/2 \rfloor+1)\cdot(2n_{ID,i}^{EPDCCH}+1)\cdot 2^{16}+n_{SCID}^{EPDCCH}$. ns is a slot number in the radio frame, $n_{ID,i}^{EPDCCH}$ is a cell index associated with a corresponding EPDCCH region, and $n_{SCID}^{EPDCCH}$ is a parameter given from upper layer signaling.

Each EPDCCH region 820 and 830 may be used for scheduling for different cells. For example, the EPDCCH in the EPDCCH region 820 may carry scheduling information for the first cell, and the EPDCCH in the EPDCCH region 830 may carry scheduling information for the second cell.

When the EPDCCH is transmitted through a multi-antenna in the EPDCCH regions 820 and 830, the DM-RS in the EPDCCH regions 820 and 830 may have the same precoding applied thereto as applies to the EPDCCH.

Compared with the PDCCH using CCE as the basis of the transmission resource, the basis of the transmission resource for the EPDCCH is referred to as a CCCE (Enhanced Control Channel Element). The aggregation level may be defined as the basis of the resource for monitoring the EPDCCH. For example, assuming that one ECCE is the minimum resource for EPDCCH, the aggregation level L={1, 2, 4, 8, 16} may be defined.

Hereinafter, the search space may correspond to the EPDCCH region. In the search space, one or more EPDCCH candidates may be monitored for every one or more aggregation levels.

Figure 9:
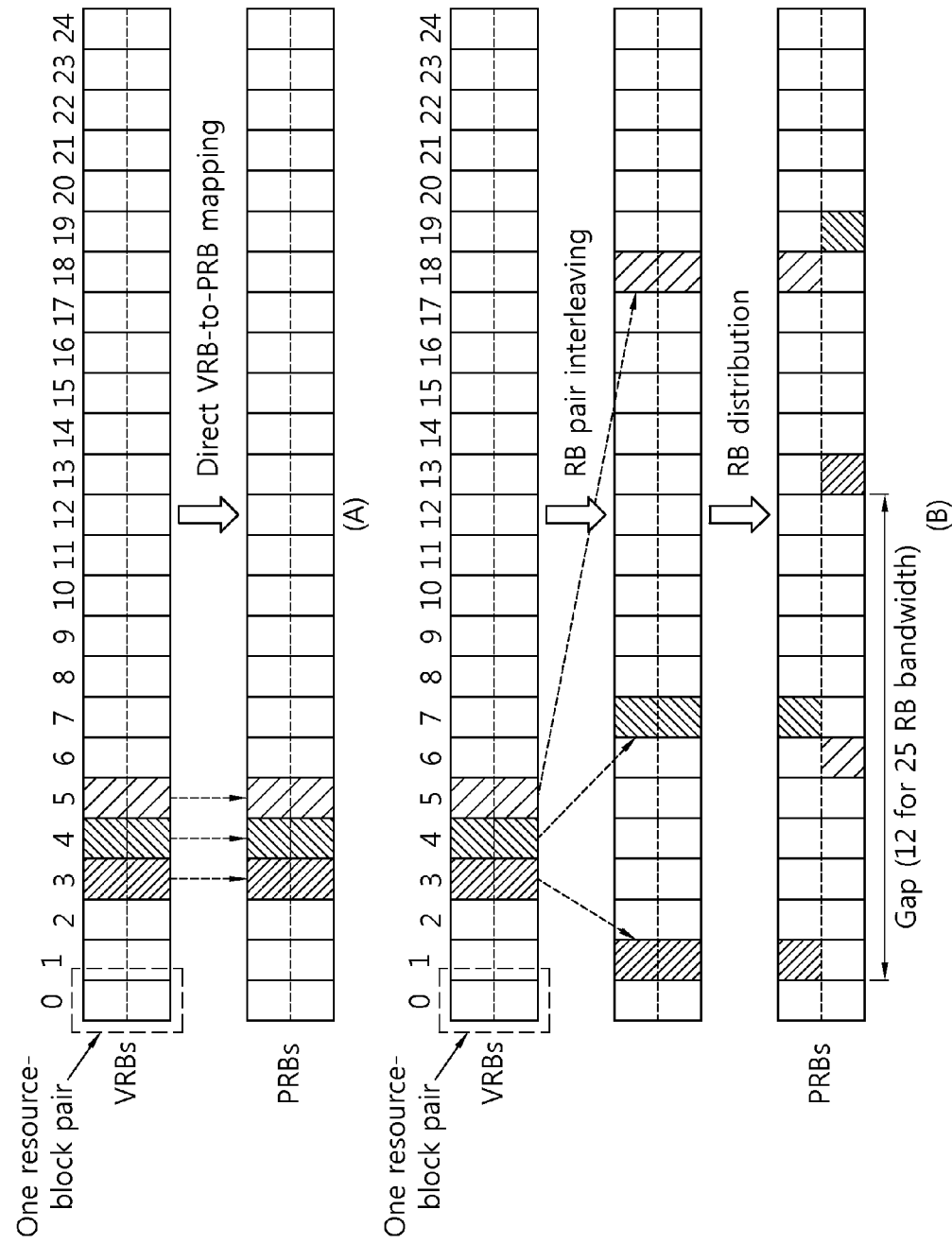
FIG. 9 is a concept view illustrating a method of performing VRB-PRB mapping based on LVRB and DVRB.

FIG. 9 is a concept view illustrating a method of performing VRB-PRB mapping based on LVRB and DVRB.

FIG. 9(A) shows an example in which VRB is LVRB. In case VRB is LVRB, the VRB may be immediately mapped to the position of the PRB. That is, the localized-type VRB may be mapped with a PRB having the same position.

FIG. 9(B) shows an example in which VRB is DVRB. IN case VRB is DVRB, the VRB may be mapped to the PRB through RB pair interleaving and RB distribution. In such case, the contiguous VRB might not be mapped to the contiguous PRB over the frequency axis. The distributed-type VRB may be mapped with the PRB that is located at a distributed position over the frequency axis based on a system bandwidth.

Next-generation systems subsequent to the LTE release 8/9/10 systems may define an NCT (new carrier type) sub-frame or extension carrier sub-frame to transmit and receive downlink data and uplink data through a newly defined sub-frame. The NCT sub-frame may be of a carrier type implemented to be optimized in small cell units such as small cells or macro cells. The NCT sub-frame may reduce overhead that occurs due to a reference signal that is problematic in the existing legacy sub-frame.

The NCT sub-frame may be a sub-frame in which whole or part of information transmitted through a channel and a signal generated in the existing system is not transmitted. For example, the NCT sub-frame might not contain information such as PDCCH data and CRS. In the NCT sub-frame, downlink control information such as DCI may be transmitted through a channel such as an EPDDCH. Use of the NCT sub-frame may mitigate interference between a plurality of cells and enhance carrier expandability.

Hereinafter, according to an embodiment of the present invention, DCI format 1A and DCI format 1 newly defined in the NCT sub-frame are described.

DCI format 1A may contain information on a downlink RB allocation method. DCI format 1A, unlike other DCI data formats, may be a data format used for a random access procedure. Specifically, the existing DCI format 1A may contain an indication bit relating to information on whether a localized allocation type or distributed allocation type is to be used as a downlink RB allocation method. The indication bit may contain information regarding whether to use a DVRB (distributed virtual resource block) or LVRB (localized virtual resource block) as the VRB. Such indication bit may be referred to as an LVRB/DVRB field or LVRB/DVRB assignment flag or assignment flag. That is, the user equipment may obtain information regarding whether the VRB (virtual resource block) is of a localized type or distributed type based on the LVRB/DVRB assignment flag.

In case DCI format 1A is used among transmission methods, different antenna ports to transmit PDSCH data may be determined depending on the type of downlink sub-frame. For example, the non-MBSFN (Multicast-Broadcast Single Frequency Network) sub-frame may determine an antenna port to transmit PDSCH data according to antenna ports that transmit PBCH data. In case the base station transmits PBCH data based on port 0 single antenna port, the PDSCH data may also be transmitted based on port 0 single antenna port. As another example, the base station may transmit PBCH data based on transmit diversity in the non-MBSFN sub-frame. The PDSCH data may also be transmitted based on transmit diversity.

The plurality of sub-frames included in the radio frame may be set as MBSFN sub-frames or non-MBSFN sub-frames by an RRC (radio resource control) message. Hereinafter, the term "MBSFN" sub-frame means a specific sub-frame configured by the base station.

The base station may transmit PDSCH data based on port 7 single antenna port in the MBSFN sub-frame. The PDSCH data transmitted based on port 7 from the base station may be subjected to demodulation based on the URS. In case the user equipment demodulates the PDSCH data based on the URS, the user equipment may demodulate the PDSCH data based on the URS.

As described above, the DVRB (distributed virtual resource block) is a method of, upon allocating the VRB (virtual resource block) assigned to the same frequency band in the sub-frame, performing allocation to different frequency bands over the frequency axis. Since the frequency bands are distributed when the DVRB is used, demodulation of PDSCH data based on the URS may be put in trouble. Accordingly, in case the user equipment performs demodulation on the PDSCH data using the URS, LVRB resource allocation instead of DVRB resource allocation may be supported as resource allocation method.

Unlike the existing legacy sub-frame in which a CRS is transmitted in each sub-frame, the NCT sub-frame may transmit a CRS based on a particular period (e.g., 5 ms). The CRS is an exemplary name for specifying a reference signal that is transmitted in the NCT sub-frame. The CRS may be referred to by other term, such as, for example, TRS (tracking reference signal). The CRS transmitted in the NCT sub-frame may be primarily used for the purpose of time/frequency tracking. The CRS transmitted at a specific period in the NCT sub-frame might not be used for the purpose of demodulating the PDSCH data.

That is, since demodulation is forced to be performed based on the URS in the NCT sub-frame, the NCT sub-frame may use only LVRB as resource allocation method regardless of whether it is an MBSFN sub-frame or non-MBSFN sub-frame. In case only LVRB is used as resource allocation method in the NCT sub-frame, LVRB/DVRB fields, the information on the resource allocation type included in DCI format 1A, are not needed. Accordingly, the LVRB/DVRB fields of the existing DCI format 1A may be used for the purpose of transmitting other information. The LVRB/DVRB fields may be used for the purpose of transmitting the following information, for example. For example, in case the sub-frame is the NCT sub-frame, the user equipment may interpret the LVRB/DVRB fields (assignment flag) as the following information to perform demodulation on the received data. The assignment flag may have a one-bit bit value.

(1) Scrambling Identifier Signaling

LVRB/DVRB fields may be used for the purpose of transmitting a scrambling identifier used for initializing a pseudo-random sequence of the URS.

The scrambling identifier may be information for securing orthogonality of a reference signal for supporting MU (multi-user)-MIMO (multiple-input multiple-output). That is, in the above-described equation, $c_{init}=(\lfloor n_s/2 \rfloor+1) \cdot (2n_{ID}^{(nSCID)}+1) \cdot 2^{16}+n_{SCID}$, $n_{SCID}$ may be transmitted based on the LVRB/DVRB fields (assignment flag).

(2) PDSCH Transmission Antenna Port Information

The LVRB/DVRB fields may include antenna port information transmitting a PDSCH and the same may be transmitted. For example, if the value of LVRB/DVRB fields is 0, the antenna port information may be indicated as 7, and if the value of the LVRB/DVRB fields is 1, the antenna port information may be indicated as 8. In case the LVRB/DVRB fields are used for PDSCH transmission antenna port information, the scrambling identifier may be fixed to 0 or 1.

The user equipment may perform the following operation after receiving the DCI including the LVRB/DVRB fields. The user equipment may determine whether to demodulate the DCI format 1A DCI based on the DM-RS. In case the DCI format 1A DCI is demodulated based on the DM-RS, DCI format 1A may be determined as control data included in the NCT sub-frame. Unless the DCI format 1A DCI is demodulated based on the DM-RS, DCI format 1A may be determined as control data included in the legacy sub-frame. In case the user equipment demodulates the DCI format 1A DCI, the scrambling identifier information or PDSCH (physical downlink shared channel) transmission antenna port information may be obtained based on the LVRB/DVRB fields. In case the user equipment demodulates the DCI format 1A DCI based on the CRS, information on whether the VRB (virtual resource block) is of a localized type or distributed type may be obtained based on the LVRB/DVRB fields.

In another embodiment, the NCT sub-frame may also use DVRB resource allocation.

When the VRBs of two slots assigned to the same frequency band in the sub-frame to the PRBs, the assignment may be made so that the frequency bands of the PRBs mapped may be the same. For example, the method of mapping the VRB to the PRB as performed in the first slot may be performed in the second slot as well. That is, RB distribution may be conducted without performing slot hopping in the DVRB. In case the NCT sub-frame also uses DVRB resource allocation, one or more additional bits may be used to transmit the scrambling identifier and PDSCH transmission antenna port information.

In order to support MU-MIMO transmission, DCI format 1A may include additional bits for MU-MIMO transmission. Additional one or two bits of signaling information regarding the antenna port and scrambling identifier or combination information regarding the scrambling identifier and the antenna port information may be added to the existing signaling information of DCI format 1A, and the same may be transmitted. As described above, in case the NCT sub-frame adopts LVRB as resource allocation method irrespective of whether the NCT sub-frame is an MBSFN sub-frame or non-MBSFN sub-frame, there is no need of LVRB/DVRB fields including information regarding the resource allocation type included in DCI format 1A. Accordingly, the LVRB/DVRB fields may be additionally used for transmitting signaling information regarding the antenna port and scrambling identifier or combination information regarding the antenna port information and scrambling identifier.

Hereinafter, according to an embodiment of the present invention, a method is disclosed of supporting MU-MIMO in DCI format 1 defined in the NCT sub-frame.

DCI format 1 may be utilized for performing downlink PDSCH transmission such as transmission diversity or single antenna port transmission based on single antenna port 0 or single antenna port 7.

The downlink PDSCH data transmission based on single antenna port 0 may perform demodulation based on a CRS (cell-specific reference signal).

The downlink PDSCH data transmission based on single antenna port 7 may perform demodulation based on a URS (UE-specific reference signal) transmitted based on antenna port 7.

The NCT sub-frame may support MU-MIMO based on DCI format 1. Regardless of whether the NCT sub-frame is an MBSFN sub-frame or non-MBSFN sub-frame, in case LVRB is used as a resource allocation method, the LVRB/DVRB fields containing information on resource allocation type included in DCI format 1 are not required. The LVRB/DVRB fields may be used as scrambling identifier signaling and PDSCH transmission antenna port information.

(1) Scrambling Identifier Signaling

In order to secure the orthogonality of a reference signal to support MU-MIMO based on DCI format 1 in the NCT sub-frame, a scrambling identifier value used for initializing the pseudo-random sequence of a URS may be signaled based on the LVRB/DVRB fields. In $c_{init}=(\lfloor n_s/2 \rfloor+1) \cdot (2n_{ID}^{(nSCID)}+1) \cdot 2^{16}+n_{SCID}$, $n_{SCID}$ may be transmitted based on the LVRB/DVRB fields.

(2) PDSCH Transmission Antenna Port Information

The antenna port information used for transmission of a PDSCH as a method of supporting MU-MIMO based on DCI format 1 may be transmitted based on the LVRB/DVRB fields. For example, if the DCI format LVRB/DVRB fields are 0, it indicates that the base station transmits a PDSCH based on antenna port 7, and if the LVRB/DVRB fields are 1, it indicates that the base station transmits a PDSCH based on antenna port 8. If the LVRB/DVRB field value is used as antenna port information, the scrambling identifier may use a fixed value such as 0 or 1.

In order to support MU-MIMO for up to four user equipments in DCI format 1, transmission may be performed with additional one or two bits added to the existing signaling bits. The one or two additional bits may be used for transmitting PDSCH transmission antenna information and scrambling identifier information for performing transmission on the additional user equipments. The NCT sub-frame may have the following transmission modes and DCI formats according to the transmission modes.

(1) Transmission Mode x1

Transmission mode x1 may be a transmission method by which the base station transmits a PDSCH through single antenna port 7 in all types of sub-frames (MBSFN( ) sub-frames or non-MBSFN( ) sub-frames). In case the base station transmits data to the user equipment through transmission mode x1, the base station may transmit control data to the user equipment based on DCI format 1A.

Transmission mode x1 may be a transmission method supportive of MU-MIMO. The base station, when performing transmission, may transmit a PDSCH up to eight layers to the user equipment. The base station may transmit control data to the user equipment using the existing legacy DCI format 2C.

(2) Transmission Mode x2

Transmission mode x2 may be a transmission method by which the base station transmits a PDSCH through single antenna port 7. In case the base station transmits data to the user equipment through transmission mode x2, the base station may transmit control data to the user equipment based on DCI format 1A. DCI format 1A may contain scrambling identifier information in the LVRB/DVRB fields.

Transmission mode x2 may also be a transmission method supportive of MU-MIMO. The base station may transmit PDSCH data up to eight layers to the user equipment when transmitting data to the user equipment. The base station may transmit control data to the user equipment based on the existing legacy DCI format 2C.

(3) Transmission Mode x3

Transmission mode x3 may be a transmission method by which the base station transmits a PDSCH to the user equipment based on a single antenna port. When using transmission mode x3, the base station may transmit control information to the user equipment based on DCI format 1A. The LVRB/DVRB fields of DCI format 1A may be information for transmitting antenna port information.

Transmission mode x3 may be a transmission mode supportive of MU-MIMO. When performing transmission, the base station may transmit PDSCH data up to eight layers to the user equipment. The base station may transmit control information to the user equipment using the existing legacy DCI format 2C.

(4) Transmission Mode x4

Transmission mode x4 may be a transmission method by which the base station transmits a PDSCH to the user equipment through a single antenna port. When using transmission mode x4, the base station may transmit control information to the user equipment based on DCI format 1A. DCI format 1A may be of the form that adds one or two bits to the existing DCI format 1A. Scrambling identifier and antenna port information may be transmitted through the one or two added bits.

Transmission mode x4 may be a transmission method supportive of MU-MIMO. When performing transmission to the user equipment, the base station may transmit PDSCH data up to eight layers to the user equipment. The base station may transmit control data to the user equipment through the existing legacy DCI format 2C.

(5) Transmission Mode y1

Transmission mode y1 may be a method by which the base station transmits PDSCH data to the user equipment through single antenna port 7 for all types of sub-frames (MBSFN sub-frames or non-MBSFN sub-frames). In transmission mode y1, the base station may transmit control data to the user equipment based on DCI format 1A.

The base station may transmit PDSCH data to the user equipment based on single antenna port 7. The base station may transmit control data to the user equipment based on DCI format 1. One bit may be added to the existing DCI format 1 for transmitting scrambling identifier information.

(6) Transmission Mode y2

Transmission mode y2 may be a method by which the base station transmits PDSCH through single antenna port 7 for all types of sub-frames (MBSFN( ) sub-frames or non-MBSFN( ) sub-frames). The base station may transmit control data to the user equipment based on DCI format 1A in transmission mode y2.

The base station may transmit PDSCH through a single antenna port and may transmit control data to the user equipment based on DCI format 1. One bit may be added to the existing DCI format 1 to transmit antenna port information.

(7) Transmission Mode y3

In transmission mode y3, the base station may transmit PDSCH data to the user equipment through single antenna port 7 for all types of sub-frames. In transmission mode y3, control data may be transmitted to the user equipment based on DCI format 1A.

The base station may transmit PDSCH data through a single antenna port and may transmit control data to the user equipment based on DCI format 1. Two bits may be added to the existing DCI format 1 for transmit of antenna port information and scrambling identifier information.

(8) Transmission Mode y4

In transmission mode y4, the base station may transmit PDSCH data to the user equipment through single antenna port 7 for all types of sub-frames. In transmission mode y4, control data may be transmitted to the user equipment based on DCI format 1A.

The base station may transmit PDSCH data through single antenna port 7. The base station may transmit control data to the user equipment based on DCI format 1.

The above-described transmission modes (1) to (8) may be summarized as in the following Table 5.

TABLE 5

| Transmission mode | DCI format | Transmission scheme of PDSCH corresponding to PDCCH |
|---|---|---|
| Transmission mode X1 | DCI format 1A | single antenna port port 7 |
|  | DCI format 2C | UP to 8 layer transmission, port 7-14 |
| Transmission mode x2 | DCI format 1A | single antenna port, port 7 Transmitting $n_{SCID}$ using LVRB/DVRB field |
|  | DCI format 2C | UP to 8 layer transmission, port 7-14 |
| Transmission mode x3 | DCI format 1A | single antenna port Transmitting antenna port number using LVRB/DVRB field |
|  | DCI format 2C | UP to 8 layer transmission, port 7-14 |

TABLE 5-continued

| Transmission mode | DCI format | Transmission scheme of PDSCH corresponding to PDCCH |
|---|---|---|
| Transmission mode x4 | DCI format 1A | single antenna port Transmitting antenna port number and $n_{SCID}$ using additional 2 bit in DCI format 1A |
|  | DCI format 2C | UP to 8 layer transmission, port 7-14 |
| Transmission mode y1 | DCI format 1A | single antenna port, port 7 |
|  | DCI format 1 | single antenna port, port 7 Transmitting $n_{SCID}$ using additional 1 bit in DCI format 1 |
| Transmission mode y2 | DCI format 1A | single antenna port, port 7 |
|  | DCI format 1 | single antenna port, port 7 Transmitting antenna port information using additional 1 bit in DCI format 1 |
| Transmission mode y3 | DCI format 1A | single antenna port, port 7 |
|  | DCI format 1 | single antenna port, port 7 Transmitting $n_{SCID}$ and antenna port information using additional 2 bit in DCI format 1 |
| Transmission mode y4 | DCI format 1A | single antenna port, port 7 |
|  | DCI format 1 | single antenna port, port 7 |

At least one of the above-described transmission modes (1) to (8) may be used as transmission mode of NCT sub-frame. That is, at least one of the plurality of transmission modes shown in Table 5 may be used as transmission mode of the NCT sub-frame, and such embodiment also belongs to the scope of the present invention.

According to another embodiment of the present invention, the user equipment may utilize antenna port information of the reference signal used for demodulating the EPDCCH in order to demodulate PDSCH data.

Figure 10:
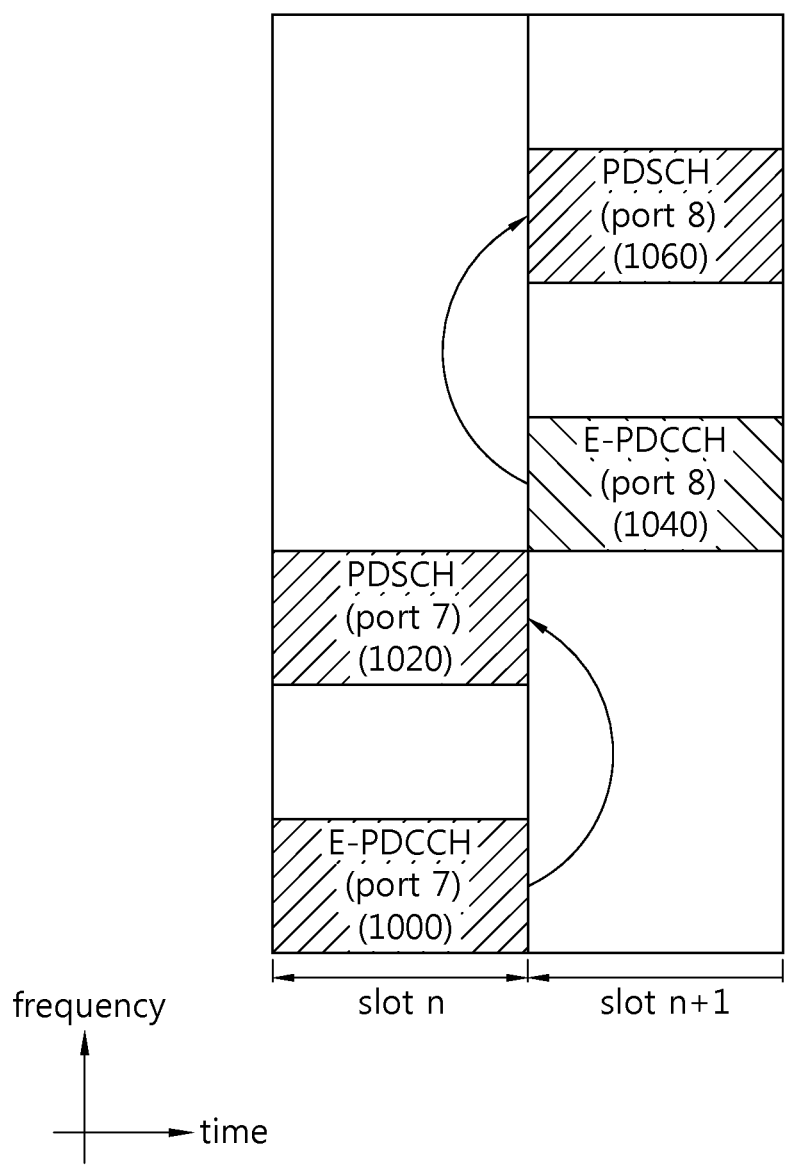
FIG. 10 is a concept view illustrating a method of demodulating a PDSCH based on an ePDCCH according to an embodiment of the present invention.

FIG. 10 is a concept view illustrating a method of demodulating a PDSCH based on an EPDCCH according to an embodiment of the present invention.

The base station may utilize an EPDCCH as well as a PDCCH as a channel for transmitting control data. The EPDCCH may perform demodulation based on the DM-RS. The information on the antenna port used in demodulating the PDSCH data may be obtained from the antenna port information of the DM-RS for demodulating the EPDCCH. For example, assume that the base station performs rank 1 PDSCH data transmission. In such case, if the antenna port number of the DM-RS used for transmission of the data 1000 is 7, the antenna port number of PDSCH is also assumed to be 7 to perform demodulation on the PDSCH data 1020. Further, in case the antenna port number of the DM-RS used for transmission of the EPDCCH data 1040 is 8, the antenna port number of PDSCH may also be assumed to be 8 to perform demodulation on the PDSCH data 1060. This is merely an example, and a predetermined mapping relation may be used to infer the antenna port number of PDSCH based on the antenna port number of DM-RS.

In a similar manner, the parameter used for detecting the EPDCCH may be used as parameter to demodulate the PDSCH. For example, the virtual cell ID and scrambling cell ID value for determining the initial value of the pseudo-random sequence of DM-RS may be used as parameters for determining the initial value of the pseudo-random sequence of URS for demodulation of the PDSCH data.

Figure 11:
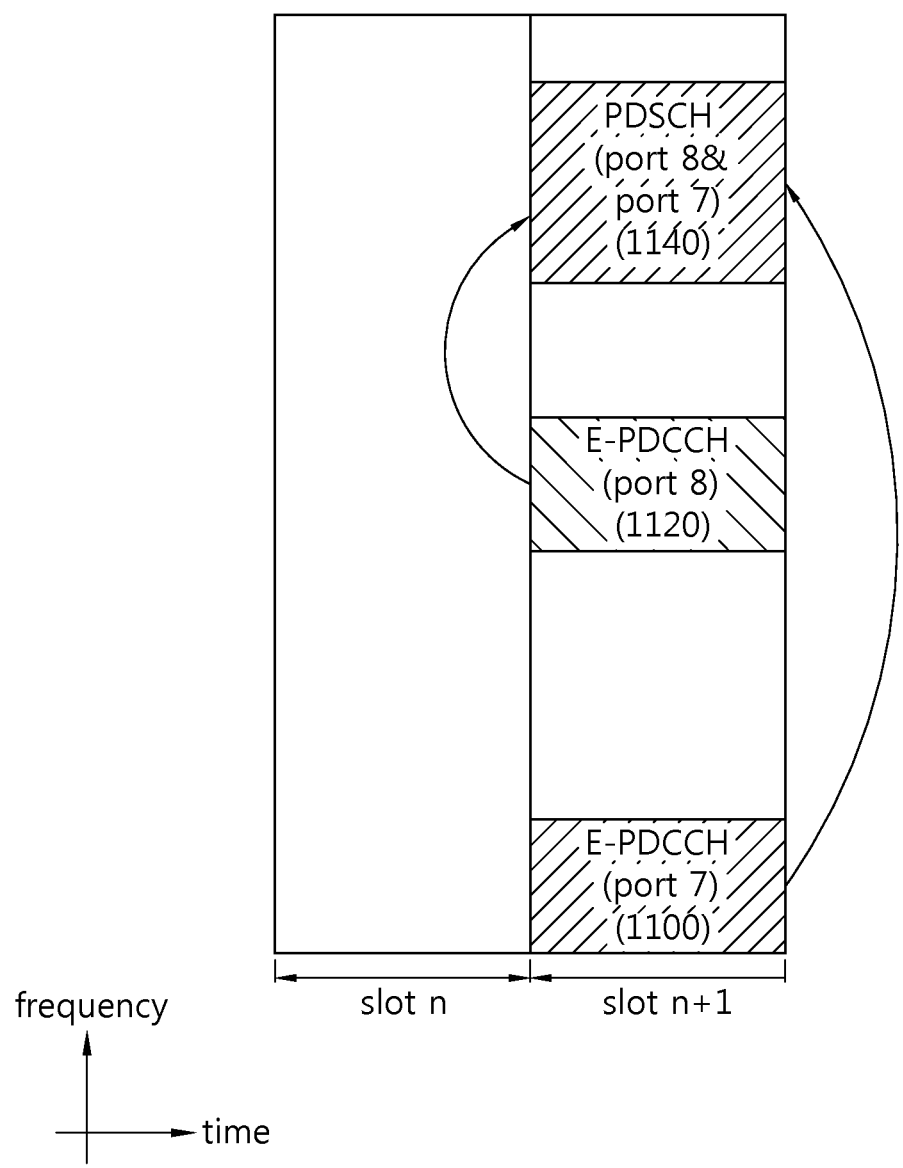
FIG. 11 is a concept view illustrating a method of demodulating a PDSCH based on an ePDCCH according to an embodiment of the present invention.

FIG. 11 is a concept view illustrating a method of demodulating a PDSCH based on an EPDCCH according to an embodiment of the present invention.

Referring to FIG. 11, it may be assumed that two user equipments (for example, a first user equipment and a second user equipment) are scheduled to the same PDSCH region based on the EPDCCH. In such case, the antenna port information or scrambling identifier information of the resource signals for the first user equipment and the second user equipment to receive the EPDCCH data may have different values from each other.

For example, in case the antenna port number of the reference signal for the first user equipment to receive the EPDCCH data 1100 is 7, the antenna port number of the reference signal for the second user equipment to receive the EPDCCH data 1120 may be 8. The PDSCH data 1140 scheduled in the same region based on different antenna port information may be demodulated so that the user equipment may obtain the PDSCH data 1140. For example, the first user equipment may demodulate the PDSCH data 1140 scheduled in the same region based on antenna port 7, and the second user equipment may demodulate the PDSCH data 1140 scheduled in the same region based on antenna port number 8. Each user equipment may demodulate the PDSCH data scheduled in the same region based on different scrambling identifier information, but not the antenna port.

Figure 12:
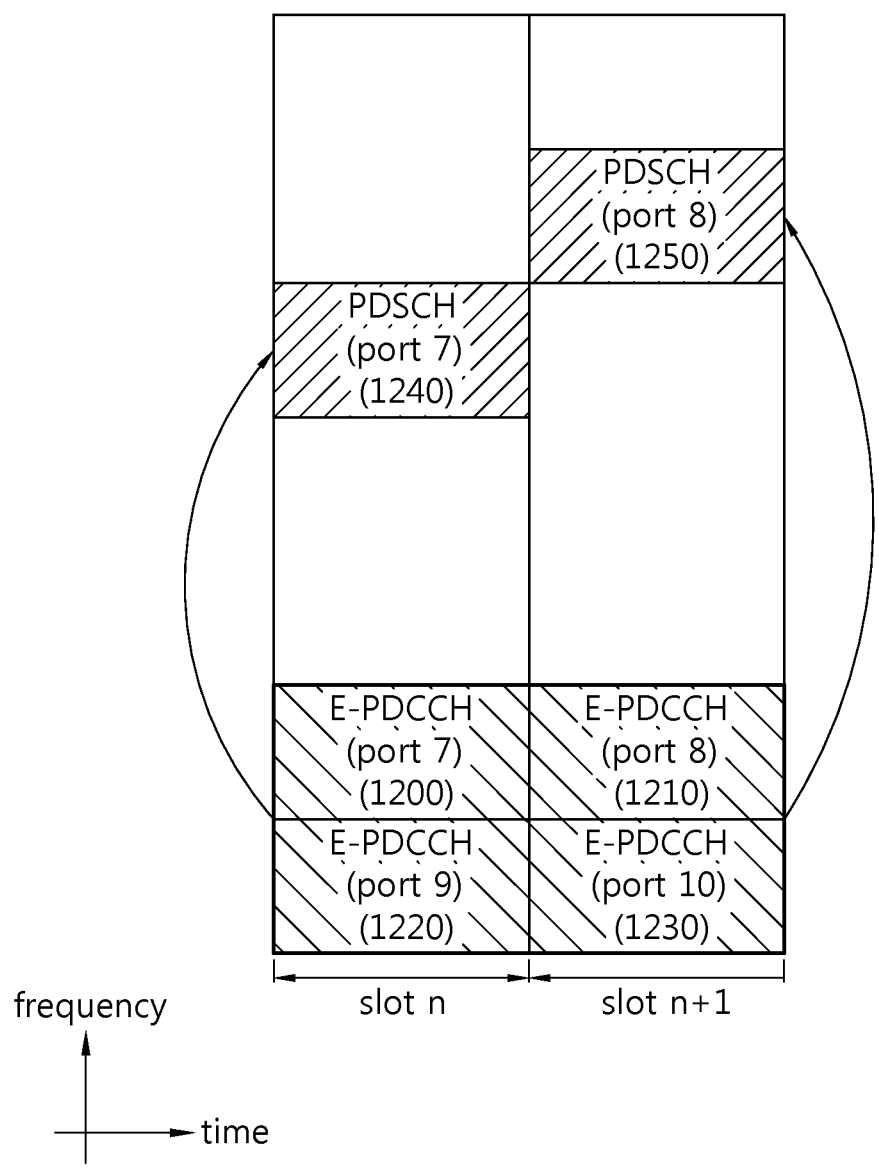
FIG. 12 is a concept view illustrating a method of demodulating a PDSCH based on an ePDCCH according to an embodiment of the present invention.

FIG. 12 is a concept view illustrating a method of demodulating a PDSCH based on an EPDCCH according to an embodiment of the present invention.

It may be assumed in FIG. 12 that the base station generates EPDCCH data based on information on a plurality of antenna ports. A group of antenna ports for transmitting the EPDCCH may be larger than a group of antenna ports for transmitting the PDSCH. For example, it may be assumed that four EPDCCH data 1200, 1210, 1220, and 1230 are transmitted in a PRB (physical resource block) pair. In case the four EPDCCH data 1200, 1210, 1220, and 1230 are transmitted in the PRB pair, four antenna ports orthogonal to the EPDCCH should be assigned. For example, the numbers of the four orthogonal antenna ports may be 7, 8, 9, and 10, respectively.

Assuming that DCI format 1A conducts rank 1 PDSCH data transmission only, the antenna port for transmitting the PDSCH data may be restricted to antenna port 7 or 8 in order not to vary the overhead of the URS.

In such case, there may be a series of relation between the antenna port for transmitting the EPDCCH and the antenna port for transmitting the PDSCH. For example, in case the antenna port for transmitting EPDCCH data is antenna port 7 (1200) or 9 (1220), the antenna port for transmitting the PDSCH data 1240 may be assumed to be antenna port 7 to perform demodulation on the PDSCH data 1240. In case the antenna port for transmitting EPDCCH data is antenna port 8 (1210) or 10 (1230), the antenna port for transmitting PDSCH data may be assumed to be antenna port 8 to perform demodulation on the PDSCH data 1250.

Figure 13:
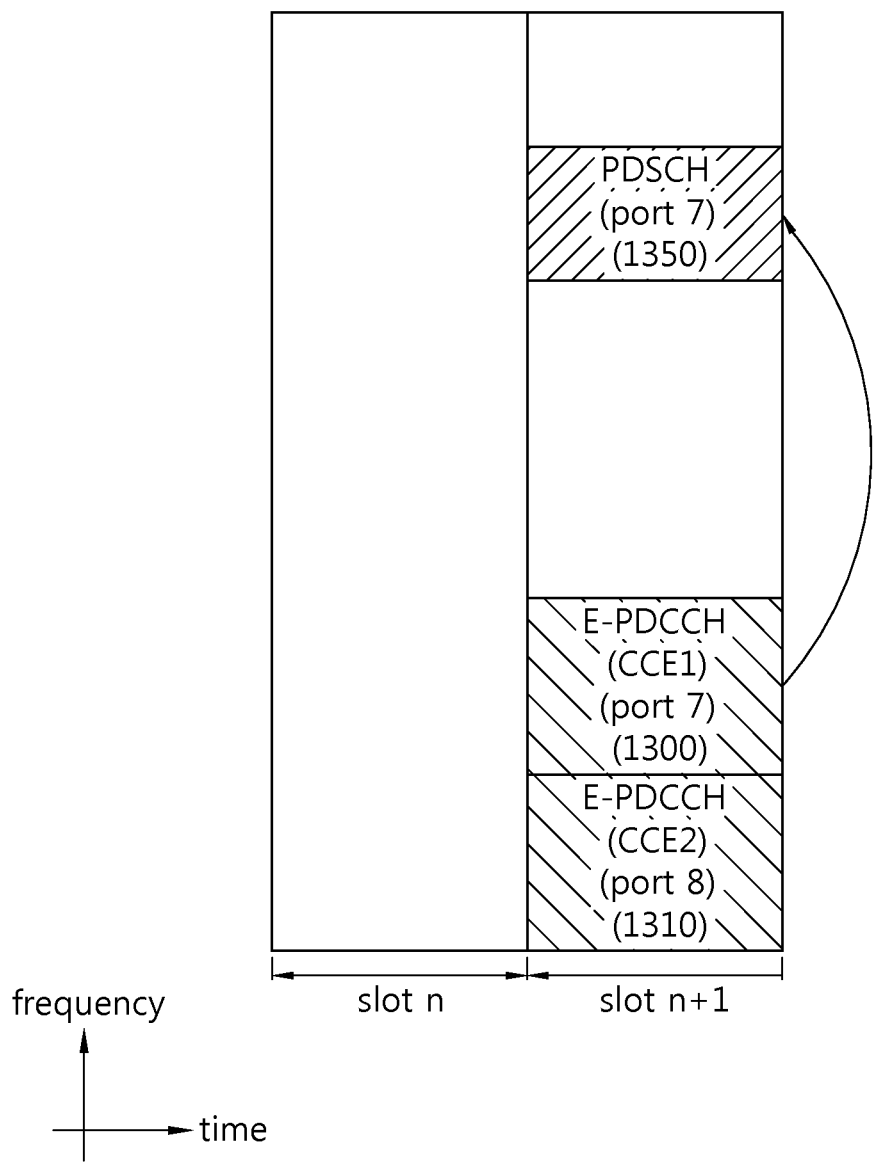
FIG. 13 is a concept view illustrating a method of demodulating a PDSCH based on an ePDCCH according to an embodiment of the present invention.

FIG. 13 is a concept view illustrating a method of demodulating a PDSCH based on an EPDCCH according to an embodiment of the present invention.

It may be assumed in FIG. 13 that the base station generates EPDCCH data based on information on a plurality of antenna ports.

A plurality of antenna ports may be used for transmission of an EPDCCH. For example, two CCEs 1300 and 1310 may be used to transmitting an EPDCCH. The two CCEs 1300 and 1310 may be transmitted based on information on different antenna ports from each other. It may be assumed that the base station transmits EPDCCH data to the user equipment based on DCI format 1A. The EPDCCH transmitted based on DCI format 1A may be transmitted through two CCEs 1300 and 1310. In case two CCEs are assumed to be positioned in different PRB pairs, the EPDCCH transmitted based on DCI format 1A may be transmitted through different antenna ports from each other. For example, the first CCE 1300 may be transmitted through antenna port 7, and the second CCE 1310 may be transmitted through antenna port 8. In such case, one of antenna port 7 or antenna port 8 may be determined as the antenna port that has sent the PDSCH data 1350 to perform demodulation on the PDSCH data 1350. For example, the antenna port used for transmitting the smaller of the CCE indexes may be determined as the antenna port that has sent the PDSCH data 1350. Antenna port 7 that is the antenna port used for transmitting the smaller of the CCE indexes may be the antenna port for demodulating the PDSCH data 1350.

According to embodiments of the present invention, in case the user equipment obtains scrambling identifier information based on the LVRB/DVRB fields, what are shown in FIGS. 10 to 13 may be used as a method of deriving the PDSCH transmit antenna port information from the information on the antenna port for transmitting the DM-RS. That is, the user equipment may derive a PDSCH transmit antenna port number from the number of an antenna port through which the DM-RS is transmitted based on a predetermined mapping relation between the number of the antenna port through which the DM-RS is transmitted and the PDSCH transmit antenna port number. As another example, the PDSCH transmit antenna port information may be acquired based on a plurality of antenna port numbers used for transmitting the DM-RS.

Figure 14:
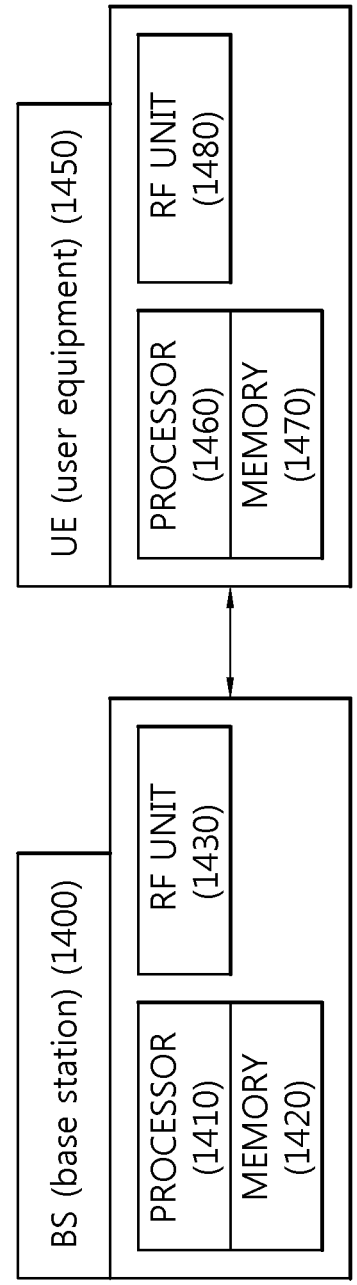
FIG. 14 is a block diagram illustrating a wireless communication system according to an embodiment of the present invention.

FIG. 14 is a block diagram illustrating a wireless communication system in which an embodiment of the present invention is implemented.

A base station 1400 includes a processor 1410, a memory 1420, and an RF (radio frequency) unit 1430. The memory 1420 is connected with the processor 1410 and stores various pieces of information for driving the processor 1410. The RF unit 1430 is connected with the processor 1410 and transmits and/or receives radio signals. The processor 1410 implements functions, processes, and/or methods as suggested herein. According to the above-described embodiments, the operation of the base station may be realized by the processor 1410.

For example, the processor 1410 may be implemented so that the assignment flag indicates information regarding the RS used for demodulation of PDSCH data or information regarding the transmission antenna port of the PDSCH or indicates LVRB allocation or DVRB allocation for the PDSCH depending on whether the generated frame is a legacy sub-frame or NCT sub-frame. The information regarding the RS used for demodulation of PDSCH data may be a scrambling identifier value used for initializing the pseudo-random sequence used for generating the RS.

A wireless device 1450 includes a processor 1460, a memory 1470, and an RF unit 1480. The wireless device 1450 may also be referred to as user equipment. The memory 1470 is connected with the processor 1460 and stores various pieces of information for driving the processor 1460. The RF unit 1480 is connected with the processor 1460 and transmits and/or receives radio signals. The processor 1460 implements functions, processes, and/or methods as suggested herein. In accordance with the above-described embodiments, the operation of the wireless device may be realized by the processor 1460.

For example, the processor 1460 may be implemented to demodulate the DCI including assignment flag and DL (downlink) resource allocation and to use the DL resource allocation to demodulate PDSCH data.

In case the DCI is demodulated based on the DM-RS, the wireless device 1450 may determine that the assignment flag indicates the information regarding the RS used for demodulation of PDSCH data or information regarding the transmission antenna port of PDSCH. The wireless device 1450, if the DCI is demodulated based on the cell-specific RS, may determine that the assignment flag indicates LVRB allocation or DVRB allocation for PDSCH.

The processor may include an ASIC (application-specific integrated circuit), other chipsets, a logic circuit, and/or a data processing device. The memory may include an ROM (read-only memory), an RAM (random access memory), a flash memory, a memory card, a storage medium, and/or other storage devices. The RF unit may include a baseband circuit for processing radio signals. When an embodiment is implemented in software, the above-described schemes may be realized in modules (processes, or functions) for performing the above-described functions. The modules may be stored in the memory and executed by the processor. The memory may be positioned in or outside the processor and may be connected with the processor via various well-known means.

In the above-described systems, the methods are described with the flowcharts having a series of steps or blocks, but the present invention is not limited to the steps or order. Some steps may be performed simultaneously or in a different order from other steps. It will be understood by one of ordinary skill that the steps in the flowcharts do not exclude each other, and other steps may be included in the flowcharts or some of the steps in the flowcharts may be deleted without affecting the scope of the invention.

What is claimed is:

1. A method of receiving control data, the method performed by a user equipment, and comprising:
    demodulating downlink control information (DCI) including an assignment flag and a downlink (DL) resource allocation; and
    demodulating physical downlink shared channel (PDSCH) data by using the DL resource allocation,
    wherein when the PDSCH data is demodulated based on a demodulation reference signal (DM-RS), the assignment flag indicates information on a reference signal (RS) used for demodulating the PDSCH data or information on a transmit antenna port of a PDSCH,
    wherein when the PDSCH data is demodulated based on a cell-specific reference signal (CRS), the assignment flag indicates an localized virtual resource block (LVRB) assignment or a distributed virtual resource block (DVRB) assignment for the PDSCH,
    wherein the LVRB assignment indicates at least one physical resource block (PRB) at a same position on a frequency domain,
    wherein the DVRB assignment indicates at least one PRB at a distributed position on the frequency domain,
    wherein the assignment flag has one bit,
    wherein the DM-RS is generated from a pseudo-random sequence initialized by a scramble identifier,
    wherein the scramble identifier is given by a base station, and
    wherein the CRS is generated from a pseudo-random sequence initialized by a cell identifier.

2. The method of claim 1,
    wherein when information on a transmit antenna port of the PDSCH is obtained based on the assignment flag, the scrambling identifier has a value of 0 or 1.

3. The method of claim 1, further comprising:
    when the scrambling identifier is obtained based on the assignment flag, deriving information on the transmit antenna port of the PDSCH from information on an antenna port through which the DM-RS is transmitted.

4. The method of claim 3,
    wherein the information on the transmit antenna port of the PDSCH is derived based on a predetermined mapping relation between a number of an antenna port through which the DM-RS is transmitted and a number of the transmit antenna port of the PDSCH.

5. The method of claim 3,
    wherein when the DM-RS is generated based on a plurality of antenna port numbers, the information on the transmit antenna port of the PDSCH is derived based on one of the plurality of antenna port numbers.

6. The method of claim 1,
    wherein information regarding the RS used for demodulating the PDSCH data is a value of the scrambling identifier used for initializing the pseudo-random sequence used for generating the RS.

7. The method of claim 1,
    wherein when the PDSCH data is demodulated based on the DM-RS, the DCI is demodulated based on the DM-RS, and
    wherein when the PDSCH data is demodulated based on the CRS, the DCI is demodulated based on the CRS.

8. A user equipment receiving control data in a wireless communication system, the user equipment comprising a processor,
    wherein the processor is configured to:
        demodulate downlink control information (DCI) including an assignment flag and a downlink (DL) resource allocation, and
        demodulate physical downlink shared channel (PDSCH) data by using the DL resource allocation,
    wherein when the PDSCH data is demodulated based on a demodulation reference signal (DM-RS), the assignment flag indicates information on a reference signal (RS) used for demodulating the PDSCH data or information on a transmit antenna port of a PDSCH,
    wherein when the PDSCH data is demodulated based on a cell-specific reference signal (CRS), the assignment flag indicates a localized virtual resource block (LVRB) assignment or a distributed virtual resource block (DVRB) assignment for the PDSCH,
    wherein the LVRB assignment indicates at least one physical resource block (PRB) at a same position on a frequency domain,
    wherein the DVRB assignment indicates at least one PRE at a distributed positions on the frequency domain,
    wherein the assignment flag has one bit,
    wherein the DM-RS is generated from a pseudo-random sequence initialized by a scramble identifier,
    wherein the scramble identifier is given by a base station, and
    wherein the CRS is generated from a pseudo-random sequence initialized by a cell identifier.

9. The user equipment of claim 8,
    wherein when information on a transmit antenna port of the PDSCH is obtained based on the assignment flag, the scrambling identifier has a value of 0 or 1.

10. The user equipment of claim 8,
    wherein when the scrambling identifier is obtained based on the assignment flag, the processor is configured to derive information on the transmit antenna port of the PDSCH from information on an antenna port through which the DM-RS is transmitted.

11. The user equipment of claim 10, wherein the information on the transmit antenna port of the PDSCH is derived based on a predetermined mapping relation between a number of an antenna port through which the DM-RS is transmitted and a number of the transmit antenna port of the PDSCH.

12. The user equipment of claim 10, wherein when the DM-RS is generated based on a plurality of antenna port numbers, the information on the transmit antenna port of the PDSCH is derived based on one of the plurality of antenna port numbers.

13. The user equipment of claim 8, wherein information regarding the RS used for demodulating the PDSCH data is a value of the scrambling identifier used for initializing the pseudo-random sequence used for generating the RS.

14. The user equipment of claim 8, wherein when the PDSCH data is demodulated based on the DM-RS, the DCI is demodulated based on the DM-RS, and when the PDSCH data is demodulated based on the CRS, the DCI is demodulated based on the CRS.

* * * * *